INVENTOR:
Lynn A. Williams
BY
Wupper, Bradolph & Love
Att'ys

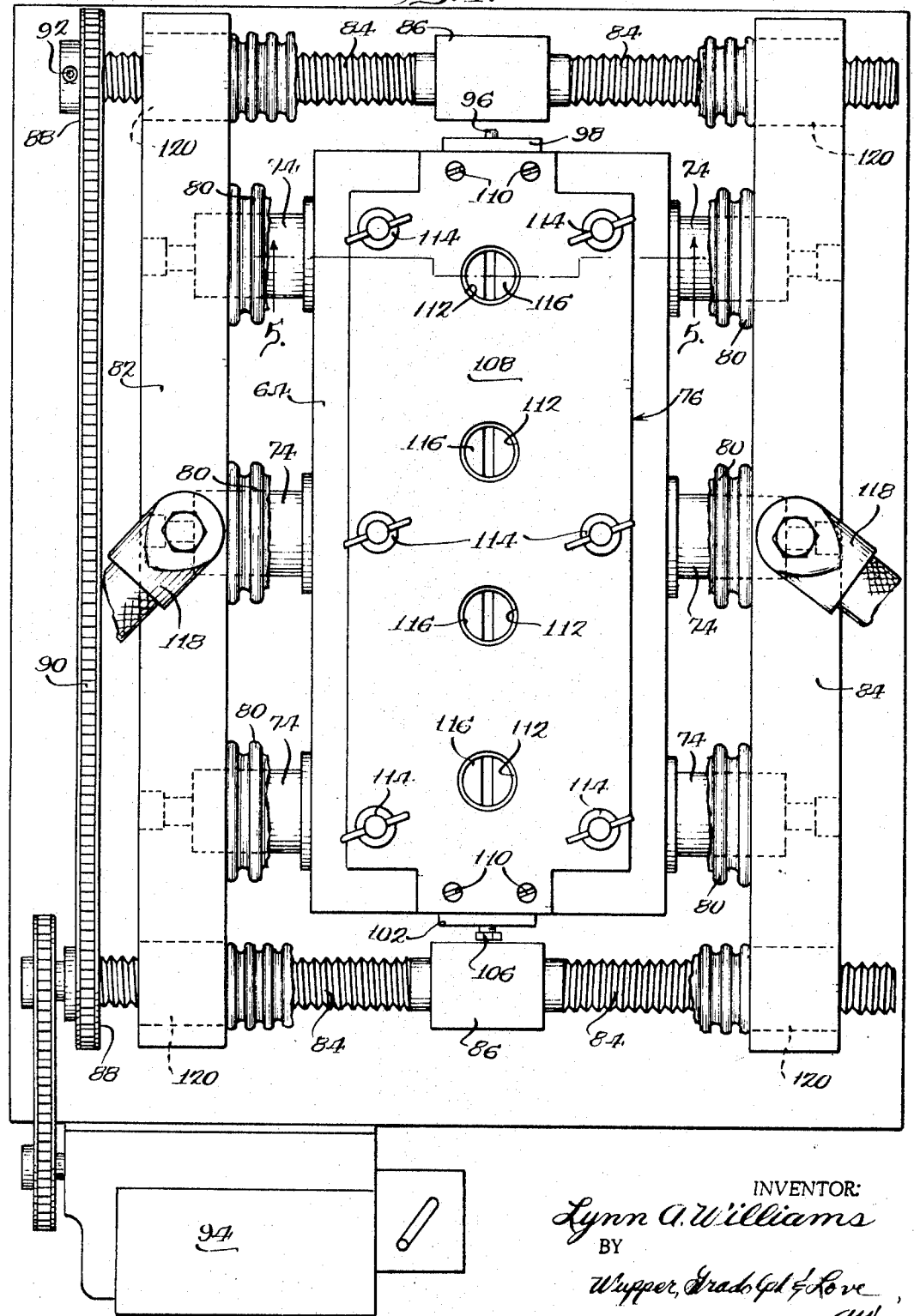

INVENTOR:
Lynn A. Williams
BY
Wupper, Bradolph & Love
attys

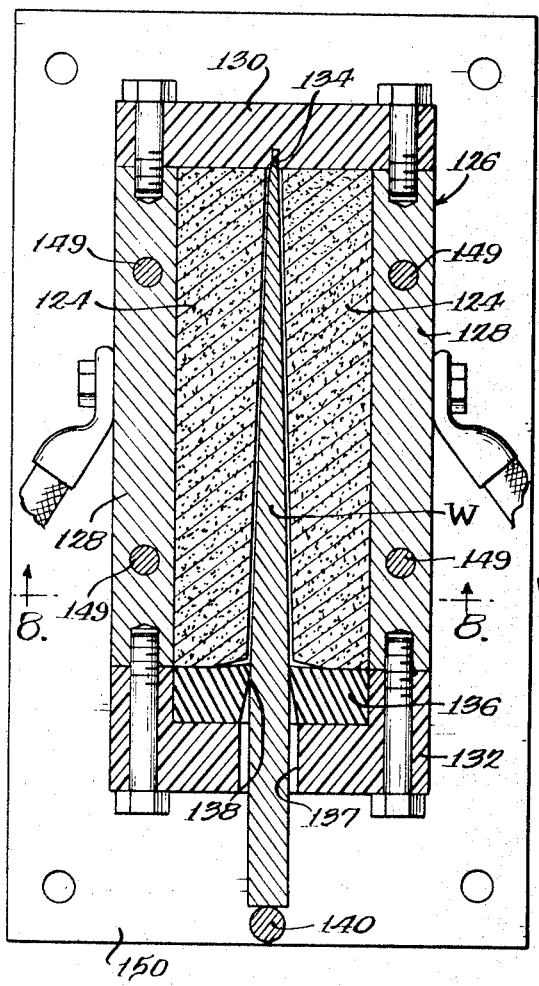
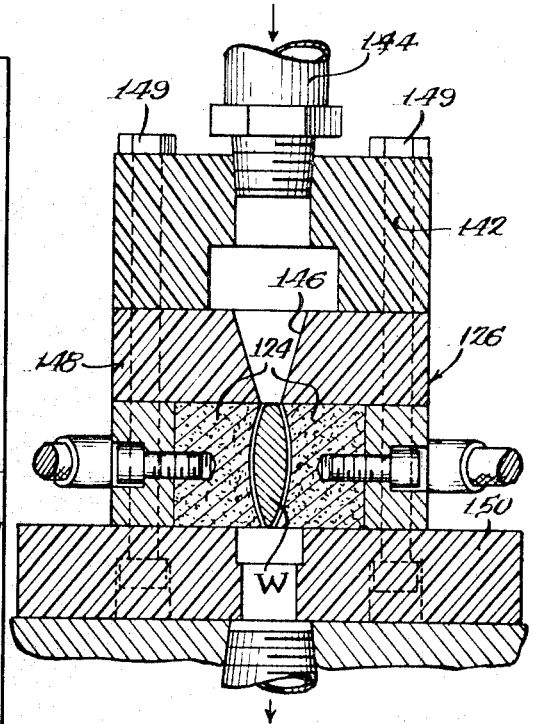
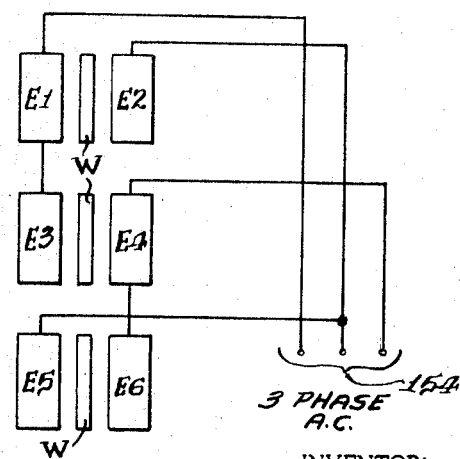

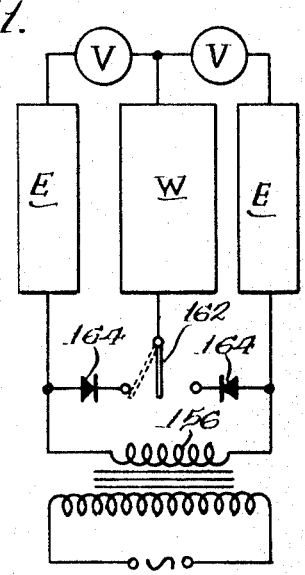
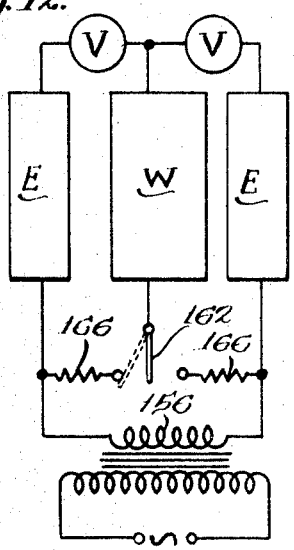
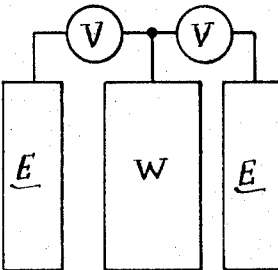
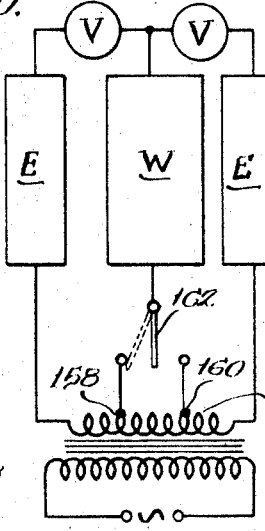
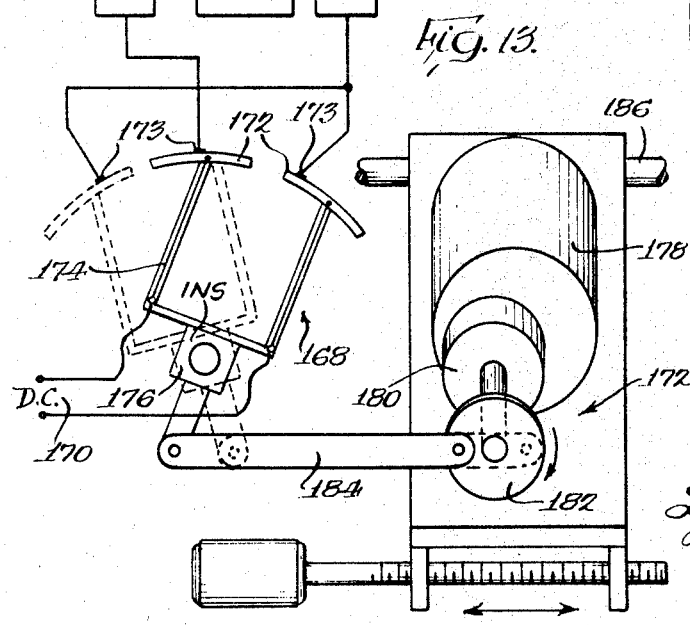

Inventor:
Lynn A. Williams
By Gradolph, Lore,
Rogers & Van Sciver Attys

3,466,235
ELECTROCHEMICALLY MACHINING A WORK-PIECE BETWEEN ADVANCING ELECTRODES HAVING JUXTAPOSED WORKING FACES USING ALTERNATING CURRENT

Lynn A. Williams, Winnetka, Ill., assignor to Anocut Engineering Company, Elk Grove Village, Ill., a corporation of Illinois
Continuation-in-part of abandoned application Ser. No. 187,902, Apr. 16, 1962. This application July 17, 1968, Ser. No. 753,824
Int. Cl. B23p 1/04
U.S. Cl. 204—143                4 Claims

ABSTRACT OF THE DISCLOSURE

The apparatus and method relate to the removal of metal by electrochemical techniques by the use of alternating current or periodically reversing current with an electrolyte consisting of inexpensive salt water solutions for the purpose of metal shaping or for purpose of inducing a high polish or for both purposes. The electrically conductive and electrochemically erodable workpiece has at least two electrically connected surfaces thereon to be treated and adjacent which the working faces of at least two electrodes are brought to define work gaps through which the electrolyte is pumped under pressure. The electrode working faces are substantially electrolytically inert and chemically insoluble in the electrolyte used. A periodically reversing current or an alternating current supply circuit is connected either to the electrodes or to the electrodes and the workpiece so that material is removed from one or the other of the workpiece surfaces to be eroded. Means are provided for sensing the voltage drops across the respective work gaps. Manual and automatic means are provided for proportioning the current flow across the work gaps so that the rate of material removal is higher from that workpiece surface which is subjected to the lower voltage drop.

CROSS REFERENCES TO RELATED APPLICATIONS

This application is a continuation-in-part of Williams, Ser. No. 187,902 filed Apr. 16, 1962, and now abandoned.

BACKGROUND OF THE INVENTION

Field of the invention.—This invention relates to the removal of metal by electrolysis for the purpose of metal shaping or for the purpose of inducing a high polish or for both purposes.

It is a characteristic of the invention that it permits the use of alternating current to accomplish electrolytic machining and that it permits the use of inexpensive salt water solutions for the purpose of accomplishing electropolishing.

Description of the prior art.—Heretofore, most electrolytic metal removal processes for shaping difficult metals by means of electrolysis have employed direct current so connected between the workpiece and the shaping electrode as to cause the workpiece to be anode in an electrolytic circuit formed by an electrolyte which is passed between the electrode and the work. One of the earliest of the type of apparatus of this kind to achieve any commercial importance is described in the copending application of Lynn A. Williams, Ser. No. 772,960, filed Nov. 10, 1958, for "Electrolytic Shaping," issued into Patent No. 3,085,895, dated Oct. 16, 1962. In some respects, this is a continuation of that application. Note, for example, FIG. 23 showing the use of alternating current for metal removal and FIG. 25 for electropolishing.

Apparatus of this kind has been used successfully. However, it has a number of limitations. The equipment, if suitably made for production use, is somewhat costly on account of the mechanical structures and the requirements for protection against corrosion on account of the use of saline solutions. Thus, for ordinary electropolishing applications the cost is somewhat disproportionate to the work to be accomplished.

Another limitation exists in the fact that when it is desired to produce electrolytic shaping on two opposite sides of a workpiece it is practical necessity to support the workpiece from the back side while the electrode cathode approaches the workpiece from the front or working side. If all the workpieces were identical in shape and size, this might not be troublesome, but, in fact, the workpieces as they are presented for this kind of operation are frequently in rough form and, accordingly, it is difficult to provide support for the workpieces on the back side. This support is necessary, particularly with thin workpieces, for two reasons: first, the hydrostatic force exerted by the passage of electrolyte under pressure tends to deflect the workpiece away from the electrode, and, second, where the sections of the workpiece are thin, it is extremely desirable to be able to introduce the positive electrical connection to the workpiece on the side opposite to the electrode. If, for example, the effort is made to introduce electric current solely from the ends of the workpiece, then, inasmuch as the electric currents may be very high, amounting to several thousand amperes, the relatively thin section of the presumed workpiece will introduce electrical resistance which will in turn cause the development of heat as well as a drop in electrical potential along the workpiece. The development of heat is detrimental because the heat is liberated into the electrolyte, thus causing a rise in its temperature, and this affects the electrolytic activity of the solution so as to cause a more rapid removal where the liquid is heated. This tends to produce inaccuracy in the work and lack of uniform conformation between the workpiece and the shaping electrode. Similarly, the drop in voltage along the workpiece causes a concomitant change in the rate of metal removal, thus introducing another possibility of dimensional error.

A third limitation is that most of the forms of apparatus which have gone into commercial use require direct current, which, in turn, demands either a direct current dynamo or a rectifier system, both of which are costly.

The present invention has among its objects the elimination of the limitations set forth immediately above.

Another object of this invention has to do with an improvement in electropolishing. It has been the practice heretofore to accomplish electropolishing by the use of one or another type of electropolishing solutions, many of them based on the use of orthophosphoric acid with one or more additive materials or upon the use of perchloric acid or its salts. The perchloric-acid systems are little used because of the explosive character of this material. The solutions based on orthophosphoric acid are costly in the first instance and, in addition, they deteriorate with use so that they have to be replaced or replenished. In consequence, the generalized application of electropolishing has been quite limited and has not been regarded as a preferred method of polishing, at least in those situations where other polishing methods are available.

Thus, it is an object of this invention to accomplish electropolishing by the use of solutions of a very inexpensive type, for example, with solutions of sodium chloride and water. Solutions of this kind may be made at a cost of the order of one or two cents per gallon. The work material which is removed and goes into the salt solution is insoluble, usually in the form of hydroxides of the metal removed, and these solid materials may be eliminated from the solution by various filtration or separating means, such as centrifuging, use of settling tanks or surface filtration. When the insoluble salts of the work material have thus been removed, the remaining portion of the solution can be used without any diminution in its effectiveness. As a result, the cost of solution used for electropolishing can be reduced to a fraction of what it has been heretofore.

Also, in electropolishing as heretofore practiced it has been the practice to suspend the parts to be polished in a tank and to leave them for a considerable period of time in the tank during the polishing operation. If any large number of pieces is to be handled, the tanks have to be large, and for production purposes it is necessary to provide conveyors and the like, all of which makes for a costly installation. Another object of this invention is to permit electropolishing at very rapid rates with very intense currents so that a relatively small piece of apparatus may yield very high productivity.

It is a general characteristic of this invention that the principal electrolyzing current by which material is removed, either for purposes of shaping or for the purposes of polishing workpieces, is supplied without making any electrical connection to the workpiece. This is accomplished by placing on opposite sides of the workpiece electrodes which serves to introduce all of the current which is used through the electrolyte itself. In its most elementary form, the invention may be thought of as that of placing a workpiece between two electrodes in an electrolyte solution but without making contact with either of them. The workpiece is thus placed in the electrolytic field created by the two electrodes in the electrolyte solution. The electrolytic field may be created either by imposing a direct current on the two electrodes or, where it is desired to attack both sides of the workpiece, then either an alternating current or a reversing direct current may be applied. Experiments have indicated that when the two electrodes are brought very close to the workpiece on both sides and an electrolyte solution pumped under high pressure and high velocity through interspaces between the electrodes and the workpiece, then a very rapid removal can be accomplished and, at the same time, in many materials a high, bright surface finish may be obtained. Where it is desired to produce only electrolytic polishing with a minimum of removal, this is accomplished by using the electric current for only a very short period of time—a few seconds at most.

The electrodes may be either fixed where not a great deal of shaping is required or where only electrolytic polishing is to be accomplished or they may be made movable where it is desired to do a considerable amount of machining or shaping of the workpiece with relatively high accuracy. Auxiliary control circuits may be provided, and are hereinafter described, whereby secondary electrical connections may be made to the workpiece in order to bring about more removal on one side than on the other or to equalize the geometric shape of the piece as desired.

It is, therefore, a further object of this invention to provide apparatus embodying and incorporating the foregoing advantages and features.

BRIEF DESCRIPTION OF THE DRAWINGS

FIGS. 4, 5 and 6 are, respectively, a general plan view, a transverse sectional view, taken along the line 5—5 of FIG. 4, and a longitudinal plan sectional view, taken along the line 6—6 of FIG. 5, of apparatus of this invention in which the electrodes are movable for purposes of accurate shaping involving the removal of considerable amounts of material from a workpiece;

FIGS. 7 and 8 are, respectively, longitudinal sectional and transverse sectional views of apparatus of this invention for use in electropolishing or rough shaping where high accuracy is not required and where it is not intended to remove large amounts of material from the workpiece; and FIGS. 9 through 16 show schematic electrical control circuits.

DESCRIPTION OF THE PREFERRED EMBODIMENTS

Figure 1:
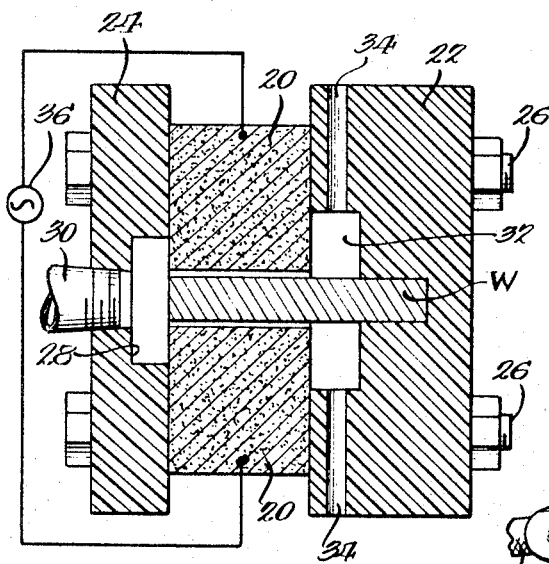
FIG. 1 is a schematic sectional view of one form of apparatus for the practice of this invention.

Referring to FIG. 1, a pair of graphite electrodes 20 is shown clamped between two insulating members 22, 24, which are preferably made of glass fiber or cloth laminated in a suitable resin such as epoxy resin.

For purposes of illustration, bolts 26 are indicated to hold the two insulating members 22, 24 in a clamped relationship against the two graphite electrodes 20. The left hand insulating member 24 is fitted with a manifold section 28 arranged to be connected by a plurality of holes for introduction of hose fittings 30 by which electrolyte is pumped into the manifold area, from which it flows on both sides of the centrally mounted workpiece W here shown as held in position by the right hand insulating member 22, thence to a plenum or receiving chamber 32 in the right hand insulating member, from which the electrolyte exits by cross holes 34. It will be noted that there is no electrical connection to the workpiece whatsoever. But electrical connections are made to the two graphite electrodes 20, and in practice an alternating current voltage drived from from 60-cycle supply lines through a stepdown transformer, indicated as a whole by the reference numeral 36, to apply about 20 volts to the electrodes has successfully been used. The voltage may range downwardly as low as three or four volts, and may range upwardly to 40 volts or even to 60 volts, but the use of high voltage is regarded as somewhat wasteful if electric power and it is preferred to accomplish the desired result by utilizing the lowest voltage which will produce the desired effect on the work material. It should be noted, however, that in this arrangement the current has to traverse two electrolytic gaps, one from the first electrode 20 to the workpiece W and a second from the workpiece W to the second electrode 20. Thus, it is necessary to apply higher voltages to secure equal passage of current than would be the case if the workpiece were directly connected as an anode in a direct current circuit, as proposed in the above identified copending application.

While 60-cycle alternating current has been successfully used, it is within the scope of the invention to utilize a reversing direct current employing either a mechanical reversing switch or, preferably, one or another form of contactless switching devices. It is also within the scope of the invention to utilize wave-shaping circuits so as to produce square-wave alternating current. However, good results have been obtained so far as producing high polish is concerned by utilization of 60-cycle, sine-wave alternating current as derived through a stepdown transformer from the ordinary power lines. It has been noted, however, that the current efficiency of the system seems to be somewhat lower than that obtained with direct current apparatus, and where this is a matter of some importance, then a reversing direct current is regarded as preferable to the 60-cycle alternating current.

The electrolyte in many experiments has been applied at a pressure of 200 p.s.i., but pressures as low as 15 p.s.i. may be used, and apparently there is no upper limit to the pressure which may be used except only the strength of the structure and the capacity of the pump and plumbing system.

As electrolyte, successful results have been obtained with a solution consisting of one pound per gallon of sodium chloride with an additional three-quarters of a pound per gallon of potassium chloride. For some materials, additives such as sodium or potassium nitrate may be used to produce a somewhat smoother surface. The nitrates may be used, for example, with chrome steel containing of the order of 10 to 13 percent chromium. In other cases, the addition of disodium phosphate may improve the finish somewhat, particularly with nickel-bearing alloys such as 18–8 stainless steel.

There is no reason, of course, why electrolytes in addition to those suggested above may not be used. Thus, one may use sulphuric acid or salts thereof, or nitric acid or salts thereof, or for some kinds of materials, such as tungsten, one may use an alkali, such as sodium hydroxide with or without other salts. The electrolyte may be chosen for its effect on the particular work materials or for minimizing deterioration or erosion of the electrodes or for both reasons.

The electrolyte system is not shown, as this is well known now in the art. It consists of a storage tank, a high pressure pump leading from the tank and connected with suitable filters, valves, gauges, controls, flow meters and the like to the inlet side of the apparatus, as shown in FIG. 1. The used electrolyte may either be discharged and thrown away or it may be returned to the storage tank or preferably it is passed through one or another form of filter to remove the insoluble metal salts which are formed when a solution of the type described above is utilized. The removal of the solids may be accomplished either by a large settling tank, by centrifuging or by one or another form of surface type filter. In this category, the filters of the diatomaceous earth type are preferred.

In practice, the graphite electrodes have been arranged so as to have an initial working gap from the workpiece of about .004″ to .005″ on each side of the workpiece. If the gap is reduced too much, for example, to .001″, then the flow of liquid is not sufficiently rapid, particularly when the distance of flow is great. The gap of .004″ to .005″ is quite satisfactory for a flow distance of about 1″, under which condition satisfactory tests have been conducted. It is estimated that this gap would also be sufficient under a working pressure of 200 p.s.i. for flow distances as great as 2″, but it is likely that for flow distances longer than this, then a somewhat larger gap will be required.

The upper limit of the gap has not been determined, but it is known that when the initial working gap is .005″, no difficulty or diminution of effectiveness is encountered as the work material is removed to a depth of .004″ per side which means that the gap at this point is .009″. It is believed, however, that the gap should not exceed .030″ per side for best results where it is desired to remove any considerable amount of material with reasonable precision.

Figure 3:
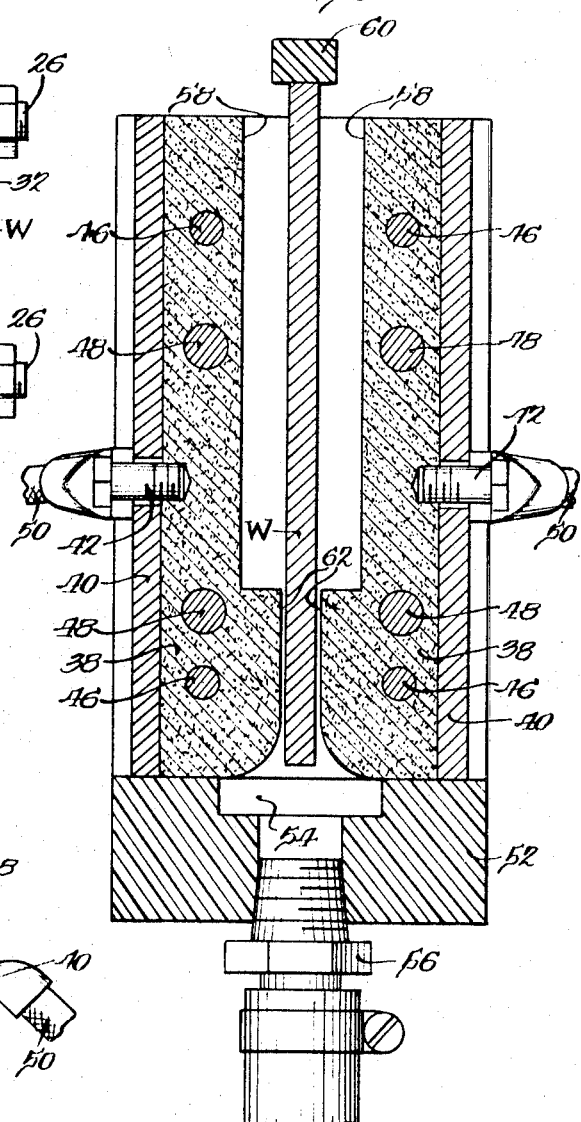
FIGS. 2 and 3 are, respectively, transverse and longitudinal sectional views of apparatus actually used in early experiments in the practice of this invention.
Figure 2:
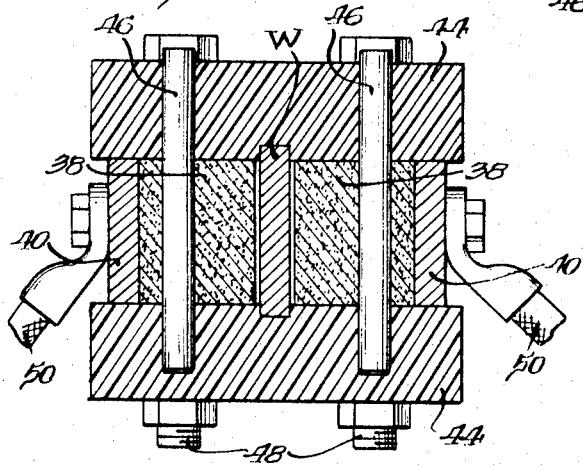

During the course of experiments, however, with apparatus like that shown in FIGS. 2 and 3, a gap of ⅛″ on each side of the workpiece existed for a portion of the length of the workpiece, and although no significant amount of material was removed in this area, a very pronounced smoothing effect was obtained, and thus for purposes of electropolishing, the use of the larger work gaps must not be ruled out.

It appears likely that the smoothing effect referred to just above may not be a genuine electropolishing action and that for electropolishing a current density of several hundred amperes may be required with the type of solution here proposed. It is known, for example, that at current densities of the order of 15 amperes per square inch a rough etching effect may be produced, while at 500 amperes per square inch a well defined electropolishing action is found in materials such as 18–8 stainless steel. It is probable that a current density of the order of about 100 amperes per square inch is required to produce high polish with simple chloride salt solutions, but the area of transition from etching to polishing may not be sharply defined and may require experimentation for different kinds of materials. Thus, one may begin with a current density of the order of, say, 15 amperes per square inch and increase the current density, either by a closer working gap or higher voltage or both, until a clearly marked electropolishing effect is obtained. As far as is known, it has not heretofore been observed that electropolishing can be accomplished with simple chloride solutions or solutions of simple acids simply by increasing the current density to the requisite level, and although insufficient experiments have been made to permit definition of the quantitative levels of current density to produce electropolishing in different materials, the idea seems clear enough to permit the establishment of the required level with simple experiments capable of being performed by anyone skilled in the art.

FIGS. 2 and 3 show apparatus used in early experiments. Two graphite electrodes 38 were used, these being backed on the exterior surfaces by copper plates 40, fastened by bolts 42 into the graphite. Insulating blocks 44 were provided top and bottom, and pins 46 were drifted from the top to the bottom insulating block in order to anchor the electrodes from sideward movement under electrolyte pressure. Stay bolts 48 were connected through the electrodes from top to bottom in order to clamp the insulating blocks 44 against the electrodes 38. Cables 50 were provided to introduce alternating current, and these were connected to the copper plates 40 by the bolts 42. At one end, as shown in FIG. 3, an insulating manifold block 52 was connected, this being bolted to the top and bottom insulating blocks. The manifold block contained a slot 54 somewhat wider than the workpiece and was arranged for connecting the ordinary hose fitting 56.

As shown in FIG. 3, the graphite blocks 38 were actually cut away at 58 so that only about 1″ of electrode was exposed in the flow direction, that is to say, from bottom to top, as shown in FIG. 3.

As shown in FIG. 2, the top and bottom insulating members were slotted to the width of the workpiece W which, in fact, was about .075″. (Some test pieces were .078″; some were .071″.) The workpiece was held against being propelled outwardly by hydrostatic force by an insulating block 60 which is shown at the top of FIG. 3.

A solution of electrolyte was pumped at a pressure of 200 p.s.i. through a gap which at the outset with the pieces .078″ in thickness was .004″ and in the case of the thinner material was .0075″.

Alternating current was applied at 20 volts. The current rose to about 650 amperes and then dropped as the work material was removed to about 400 amperes at the lowest.

Opposite the closely spaced portions 62 of the electrodes 38 the work material was removed, and on the 18–8 stainless steel samples a very bright, mirror-like surface was obtained. In the area where the space was about ⅛″ per side, the workpiece was covered with a brown soft coating which, when scrubbed off, revealed a surface which was smooth but did not show polishing.

This kind of apparatus can be used for simple polishing work and could with slight revisions be used to pass the work material continuously between the electrodes 38 so as to reduce the section or to produce polishing or both.

With a duration of ten seconds, the material was thinned by about .004″ or .002″ per side. With an increased duration, the material was thinned about .008″ in a period of thirty seconds. It is believed that the reason for the relatively slower rate was due to the fact that the current fell off as work material was removed and the working gap therefore increased. The area exposed to the closely spaced portions 62 of the electrodes about one square inch, and thus it appears that the removal rate was less than what would be expected with this current density in a direct current arrangement like that of the above mentioned application. In the direct current arrangement, a penetration rate of .050″ per minute could be expected. Here, the penetration rate was about .024″ per minute.

Figure 5:
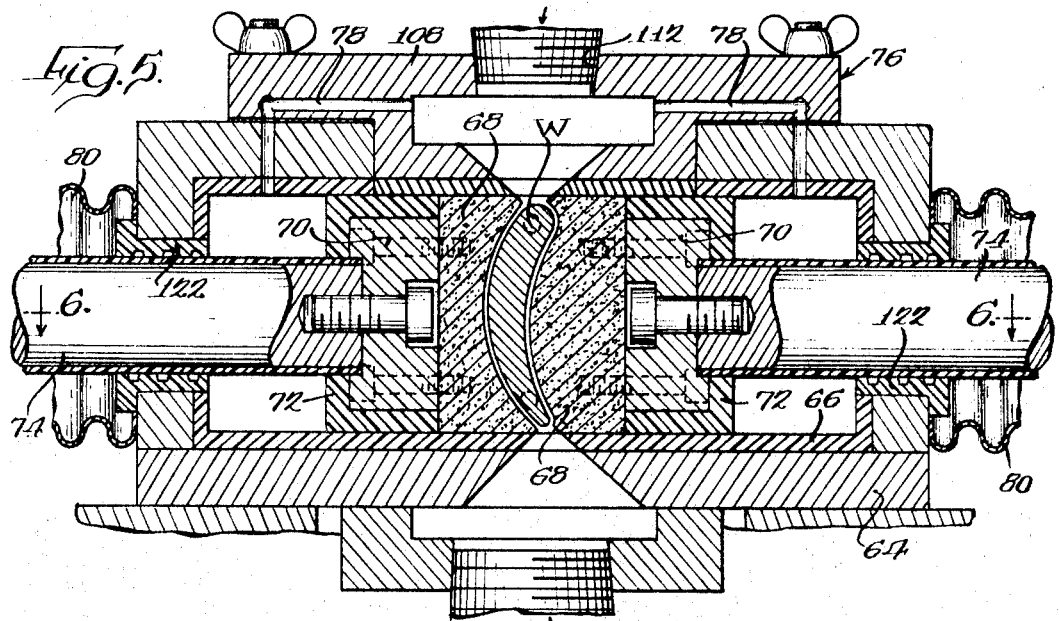
Figure 6:
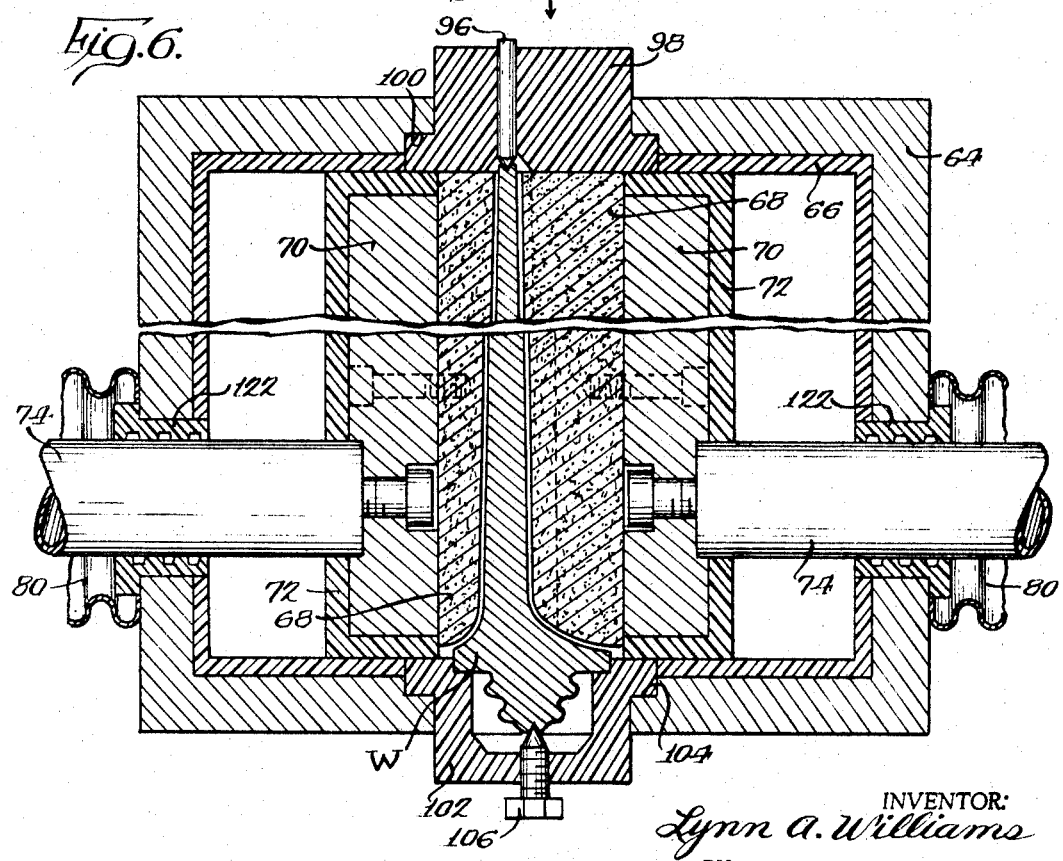

Referring to FIGS. 4, 5 and 6, a system for movable electrodes is shown. The general scheme is shown most clearly in FIG. 5. A steel frame 64 is provided, which is lined with insulating material 66 throughout. Within the lining, the graphite electrode blocks 68 are mounted so that they can slide. The graphite blocks are fastened to copper or bronze bus bar members 70, which also are provided with an insulating material coating 72. The copper or bronze bus bars 70 are in turn connected to three push rods 74 (see FIG. 4). A manifold structure 76 is connected so as to permit introduction of electrolyte, and bleed holes 78 are provided so that the high pressure electrolyte is introduced into the space behind the electrodes so as to balance the forces. In face, it is probable that the force is more than overbalanced because of some Bernoulli effect reducing the static pressure in the work zone.

The three push rods on each side are booted at 80 and connected to driver blocks 82, shown right and left in FIG. 6. The driver blocks are controlled in their motion by lead screws 84 at each end having thrust bearings 86 in the middle and left hand and right hand threads at opposite ends. The two lead screws are linked together by sprockets 88 and a sprocket chain 90 with an idler pulley (not shown) to pull the chain up tight. One of the sprockets 88 is made so that it can be slipped and adjusted in position with a set screw 92 to bring the two lead screws into identical position. A variable speed motor drive 94 is provided to turn the lead screws.

Referring to FIG. 6, the workpiece W is shown in position in a sectional drawing taken on the line 5—5 of FIG. 6. The workpiece W is fastened at its small end by a hardened pin 96 which engages a recess provided in the workpiece for that purpose. This pin is set in an insulating block 98 which is arranged to slide in a kind of keyway 100 in the steel case. At the root end of the part, a similar insulating block 102 is provided, also arranged to slide in a keyway 104 in the steel case. At this end, two locating pins 106 are provided to get the desired angular orientation of the part or workpiece. The two insulating blocks 98, 102 which provide the support for the workpiece are fastened to cover 108 forming part of the manifold structure 76 by screws or bolts 110. The cover is provided with four openings 112 for connection of electrolyte hoses and six thumb screws 114 to fasten it down in position. When the cover 108 is lifted, it carries upward with it the insulating blocks 98, 102 shown in FIG. 6 which support the workpiece W. The locating pins 106 at the root end of the part are made in such a way that they can be withdrawn or they may be set screws, as shown. Thus, when the cover 108 is removed, the workpiece W can be inserted in the plastic holding blocks by withdrawing the pins 106. The pins are then relocated to hold the workpiece in the plastic blocks, and then the cover is put back in position and screwed down.

An alternate arrangement is to feed the electrolyte from the opposite side so that it exits through the holes 112 shown in FIG. 4 which may be provided with slotted fittings 116. Thus, the cover 108 may be removed without having to drag any hoses with it.

Suitable indicating devices are provided to show the rate of infeed; also, the actual position of the electrodes. A limit switch is also provided so that when the desired depth is reached, the current is turned off and the infeed is stopped. Electric current is introduced to the electrodes 68 through the three push rods 74 on each side by making cable connections at 118 to the drive blocks 82. To prevent short circuiting, insulating bushings 120 are provided where the lead screws 84 pass through the drive blocks 84, and in this way it is permitted to connect power electric cables to the drive blocks 84 to introduce current into the push rods 74 which also slide through insulating bushings 122.

FIGS. 7 and 8 show an arrangement for electropolishing or parts or workpiece W like those which might be used in cutlery. As shown in FIG. 7, two fixed graphite electrode blocks 124 are mounted in a case 126 which has brass sides 128 and insulating blocks 130 and 132 at the ends bolted to the sides. The insulating block 130 shown at the upper portion of FIG. 7 has a recess 134 centrally located with respect to the two graphite electrode blocks 124 and is adapted to receive a tang which is forged as a part of the workpiece.

At the opposite end, the insulating block 132 carries a heavy rubber sealing element 136. The workpiece W is introduced through an aperture 137 in the block 132 and a normally closed opening 138 in the rubber sealing element, pushing it apart slightly. Then a removable insulating pin 140 is put in place so that there will be no tendency to drive the workpiece out of the fixture.

A manifold block 142 of insulating material is provided to feed salt water electrolyte across the workpiece, as is shown in FIG. 8. The manifold must be of sufficient size and there must be a sufficient number of hose connections 144 to assure that an even flow of electrolyte through an inlet slot 146 in an intermediatae insulating block 148 is obtained. The case 126, manifold 142, and intermediate block 148 are secured by bolts 149 to an insulating base plate 150 having the electrolyte outlet 152 therethrough.

The spacing of the graphite electrode blocks 124 is set to provide a clearance of perhaps .010″ or perhaps .015″ from the workpiece, the distance, of course, varying somewhat from one workpiece to another. The workpiece is inserted manually, the electrolyte flow is started, and the current supply is energized. If it is desired to reduce the thickness of the workpiece W to some more or less standard dimension, the electric current is continued until an ammeter reading drops to a predetermined level; thereupon the system is de-energized, and the workpiece is withdrawn. If it is desired only to polish the part of workpiece, the current is turned on for only a few seconds.

Referring to FIG. 9, there is shown a schematic diagram for the connection of apparatus of this invention to a three-phase line. In order to achieve reasonable electrical balance amoing the three phases ordinarily supplied for industrial establishments it is intended that three work chambers, each with a pair of electrodes E and each pair embracing a workpiece W, be provided and be operated simultaneously. In FIG. 9 the electrodes are designated E1 and E2 for the first chamber, E3 and E4 for the second, and E5 and E6 for the third. In each case, a workpiece marked W is interposed between the electrodes in the manner hereinbefore set forth. The pairs of electrodes are then connected to a three-phase supply 154, which may be considered as taken from the secondary windings of a three-phase stepdown transformer. It is intended that each working chamber be loaded with its workpiece at the same time, that the electrolyte supply be started and, then, that all three work chambers be electrically energized simultaneously. It is also intended that the three workpieces W be substantially the same in size and that the electrodes be advanced at the same rate in each case, thereby holding the electrical loading of the three phases nearly equal so as not to cause serious unbalance.

Referring to FIG. 10, there is shown a very simple circuit for bringing about an uneven removal on the two opposite sides of the workpiece W where this is required. It will be noted that the workpiece is shown as asymmetrically disposed with respect to a midline between the two electrodes E. It is assumed, however, that it is desired to finish the piece so that, when completed, it is symmetrical with respect to this midline. This means that more material has to be removed from the right hand side than from the left hand side. In order to accomplish this, taps 158, 160 on the transformer secondary 156 are provided, one of them 158 near one end of the winding and the other 160 near the opposite end of the winding. The center arm of the tap switch 162 is then connected to the workpiece W. Voltmeters V are connected between each electrode E and the workpiece W. If there is an inequality in spacing between the workpiece and the two electrodes, then the voltmeter with the higher reading will indicate the side of the workpiece where the greater spacing exists. This can be measured with the tap switch 162 in its midposition, where it makes contact with neither of the taps on the transformer. Under the condition shown, the tap switch 162 is then turned toward the left as indicated in dotted lines, with the result that a somewhat higher voltage is effectively imposed between the workpiece and the right hand electrode. When the current flows in a sense to make the workpiece anodic with respect to the right hand electrode, a higher removal rate will occur than is the case when the current flows in the reverse direction so that the workpiece is anodic with respect to the left hand electrode. The fact that a higher current will also flow in the right hand work gap when the current is in a direction which makes the workpiece cathodic with respect to the right hand electrode is of no consequence, for under this condition no material is being removed in the right hand work gap.

FIG. 11 shows another form of work balancing system. In this arrangement two rectifier elements 164 are utilized with the switch 162 having its center arm connected to the workpiece arranged to be connected to one or the other of the rectifiers as shown in the circuit diagram. The voltmeters V indicate any inequality in centrality of the workpiece W, and in the configuration shown it is evident that more material should be removed at the right hand work gap than at the left hand work gap. In operation, this will be indicated by a lower voltage reading on the right hand voltmeter than on the left hand. Under this condition, then, the rectifier switch 162 is moved to the left, as shown in dotted lines. The sense of the rectifier is such that, when the current in the work gap on the left hand side flows in such a direction as to make the workpiece an anode, a considerable part of the current is short circuited through the rectifier element, thereby reducing the flow of current on the left hand side during the half cycle when metal removal would occur. On the right hand side, however, there is no such short circuiting effect.

FIG. 12 shows a similar and preferred arrangement in which instead of rectifier elements resistors 166 are used, which will accomplish the same purpose. Here, again, where it is desired to remove more metal on the right hand work gap, the switch 162 is moved to the left hand side so that less current passes through the electrolytic work gap on the left hand side, part of it being bypassed by the resistor 166, the consequence of which a greater amount of removal will be accomplished on the right hand side, where it is desired.

In all of the schemes of FIGS. 10, 11, and 12 it will be seen that the equalizing is accomplished by reference to voltmeters V connected between the workpiece W and the two electrodes E and that a greater current is caused to flow on the side where the lower voltage is indicated. This has to be done intermittently so that periodic readings of the voltmeter can be obtained to ascertain whether equality has been achieved. If it has been achieved, then the balancing switch is put to its midposition, and the work removal then continues. If accidentally the balancing operation is carried too far, this will then appear in the voltmeter reading, and in this case then the switch 162 is moved to the opposite side to achieve balance.

Still another method of accomplishing the same result is by introducing a direct current bias in the direction required to bring about a desired balance. In this arrangement no electrical connection to the workpiece is required.

FIG. 13 illustrates an arrangement in which a reversing switch 168 is used with a direct current supply 170. The reversing switch may be mechanically driven, as shown, by an electric motor drive 172 arranged to cause switching at a rate of anywhere from one to five times per second.

The switch 168 comprises a pair of arcuate bars 172 arranged to contact taps 173 to the electrodes E and carried on a frame 174 mounted on an insulating pivotally mounted block 176. The frame 174 and bars 172 are oscillated between the full and dotted line positions by a motor 178 connected through a gear reduction 180 to a crank wheel 182 and thence through the connecting arm 184 to the block 176.

As shown, the driving mechanism 172 is so arranged that it can be moved either to the right or to the left on slides 186 provided for the purpose. When the driving mechanism is in its midposition, then the duration of current supply in both flow directions of current is equal. However, if the drive mechanism is displaced slightly to the right, then a longer duration of current will be supplied during the time when the switch arms are in the position shown in dotted line, and in this way the desired correction of any unbalance in location of the workpiece with respect to the midline can be achieved. A motor 187 and screw 189 are arranged to move the driving mechanism on the slides 186. The operation of the motor 187 may be manually controlled or it may be connected to be driven in response to a detected unbalance in the voltmeter readings.

Contactless switching using solid state devices or thyratrons may be used in appropriate and known circuitry and for practical industrial application this will be done.

Figure 14:
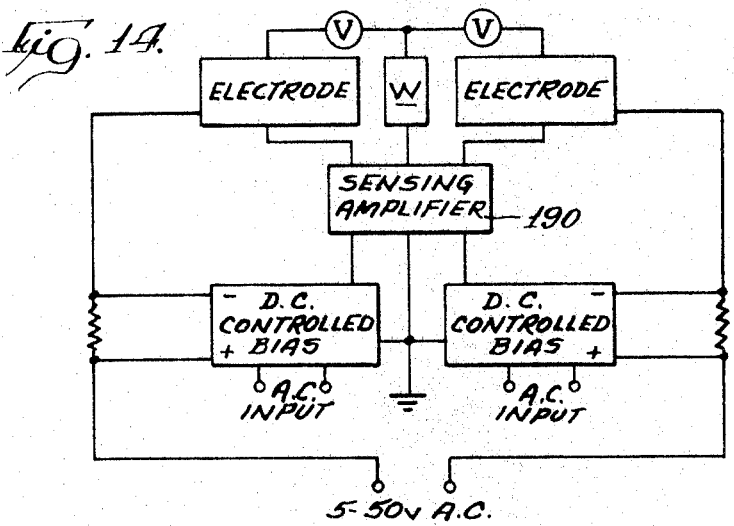
Figure 15:
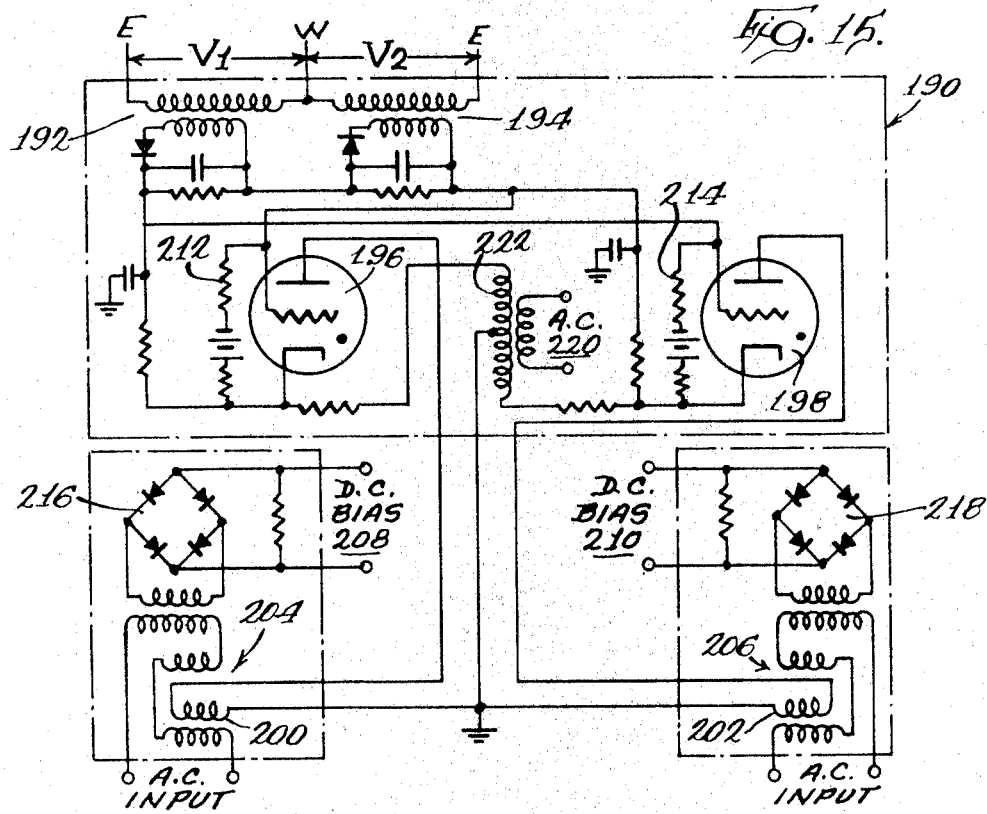

FIGS. 14 and 15 show the circuitry for an automatic control system to bring about balance.

As shown, a sensing amplifier 190 is provided which responds only to the alternating current component which passes between the respective electrodes and the workpiece. These two alternating current voltages are fed to two transformers 192, 194, whereby signals are derived to control two thyratrons 196, 198, which in turn feed the control windings 200, 202 of saturable core reactors 204, 206 established in the alternating current circuits of two direct current bias supplies 208, 210. As shown in FIG. 15, these two direct current bias supplies are connected back to back in such a way as to introduce a direct current bias in either one sense or the opposite to the electrolyzing alternating current supply. The amplifier system is so arranged that when the voltages in the two respective work gaps are equal neither thyratron 196, 198 will fire, as the control grids of both are biased negatively at 212, 214. However, if the signal is generated in such a way as to cause one of the thyratrons to have its grid driven more positively, then this thyratron will fire, thus providing saturating current to the respective saturable reactor and thus causing the generation of a direct current in the bridge rectifier 216 or 218 appropriate to bring about a correction of the unbalanced situation. During this time the other thyratron will be suppressed. The two bridge rectifiers are arranged to feed across a shunt to conduct the alternating current. If desired, large capacitors may be used instead of the resistors.

The thyratrons 196, 198 are so connected to the rectified outputs of the secondaries of the transformers 192, 194 that when the grid of one is rendered positive by a received signal, the bias on the other is rendered relatively more negative by the inverse of the signal thus insuring that only one thyratron will fire while the other is suppressed.

In order to insure that the thyratrons 196, 198 will be extinguished when one or the other has been fired, they are fed from an alternating current source 220 through a transformer 222 having either a pair of secondaries or a center tap secondary, the common tap of which is connected to the control windings 200, 202 of the saturable core reactors. Consequently, the fired tube will be extinguished on each half cycle of the supply circuit and will refire only as long as the voltages sensed at V1 and V2 are unequal.

The generality of the control when it is automatic consists in providing an amplifier in which the two voltage drops on the respective sides of the workpieces are compared, thereby deriving a signal so as to unbalance the electric current flow to cause more removal of material on the side where the voltage drop is the lower and to continue this operation until the two voltage drops are equal.

It should also be noted that with the schemes of FIG. 13 and of FIGS. 14 and 15 no secondary connection to the workpiece is required in order to bring about balancing.

Figure 16:
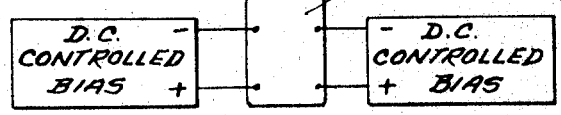

FIG. 16 diagrammatically discloses an automatic control for utilizing the electronic circuit shown in FIGS. 14 and 15 to automatically control the system shown in FIG. 13. In this embodiment the direct current controlled biases are connected to a reversible motor 224 which drives a shaft 226 in one or the other directions depending upon the current produced in one or the other of the direct current controlled biases. Shaft 226 rotates a worm gear 228 which in turn drives gear 230 connected to shaft 189 of FIG. 13. In this manner FIG. 13 functions as described instead of manual rotation of the shaft. This is accomplished automatically by the said electrical control circuits. In this instance the motor 187 shown in FIG. 13 is replaced by the reversible motor 224 and attendant parts shown in FIG. 16 in order to drive shaft 189.

While in the foregoing description it has been suggested that the two inert electrodes be mounted to act upon opposing sides of a workpiece, this may not always be the case. Thus, one of the two electrodes might operate on one face and the other might operate on another face at 90° to the first one. Indeed, the two electrodes may be so arranged as to operate on two parts of the same surface. And it is intended that where in the claims there is reference to two surfaces of a workpiece that this be taken to include two surfaces which may be different regions of a single plane. For example, if one wishes to drill two round holes through a workpiece, it is possible to mount two tubular electrodes on an insulating block on a movable ram or carrier, the electrodes and the ram configuration being like those illustrated in the above identified copending application, Ser. No. 772,960. The working tips of these electrodes are to be made then of graphite or other electrolytically inert material, and the interior and exterior surfaces of the tubular bodies of these electrodes are then to be coated with a suitable insulating material. Electrolyte is pumped through separate hoses to the bores of each of the two electrodes so that electrolyte passes down through them toward the work surfaces. Electrical connections for supplying reversing current are made to the two electrodes. No connection is made to the workpiece except in those instances where it is desired to follow one of the previously described methods for bringing about equalization through unequal removal at the two electrodes. As the ram face is advanced, carrying the two electrodes toward the workpiece, the electrode which is cathodic causes removal of metal from the opposing surface of the work material, while the second electrode at this time simply serves to pass current to the workpiece in such a direction as to make it anodic with respect to the first electrode. When the current reverses, then, of course, the roles of the two electrodes are reversed. While this has been illustrated by reference to the use of two tubular electrodes for drilling holes, these electrodes might be two with three-dimensionally contoured working faces, each arranged so as to permit the introduction of electrolyte between the electrodes and the workpiece which lies opposite. The two electrodes may be placed very close together, but in such circumstances if there is likelihood of having any electrolyte fill the close spacing between the two electrodes, then the adjoining surfaces should be insulated away from each other. Otherwise, electric current may pass from one electrode directly to the other, which will waste electric energy for such passage of current, of course, will not cause any work removal.

While preferred embodiments of the electrolytic removal apparatus and method constituting this invention have been shown and described, it will be apparent that numerous variations and modifications may be made without departing from the underlying principles of this invention. It is therefore desired, by the following claims, to include within the scope of the invention all such modifications and variations by which substantially the results of this invention may be obtained through the use of substantially the same or equivalent means.

What is claimed as new and desired to be secured by United States Letters Patent is:

1. In an apparatus for electrolytically removing material from at least two electrically connected surfaces of an electrically conductive and electrolytically erodable workpiece having means for supporting the workpiece, a pair of electrodes having electrically conductive working faces of an area at least as great as the areas adapted to be shaped on the workpiece and adapted to be brought into close spacing relationship but out of contact with the workpiece surfaces to be shaped so as to define therewith work gaps therebetween, means connected to the work gaps for pumping an electrolyte thereto under superatmospheric pressure, said electrode working faces being substantially electrolytically inert and chemically insoluble in the electrolyte, and electric means connected to the electrode working faces for passing therebetween and through the workpiece an alternating electric current so that the polarities of the electrode working faces and the adjacent surfaces of the workpiece to be eroded are periodically being reversed, whereby material is removed from the surface of the workpiece which is anodic relative to the adjacent electrode working face, the improvement comprising means in the circuit means for sensing and comparing the voltage drop across each work gap, and means responsive to and controlled by said sensing and comparing means for placing a direct current bias on the alternating electrolyzing current to increase the current flow in the material removal direction across that work gap having the lower voltage drop.

2. In the apparatus claimed in claim 1 wherein the means responsive to and controlled by said sensing and comparing means includes a reversible motor means connected to said sensing and comparing means to increase the current flow in the material removal direction across that work gap having the lower voltage drop.

3. In the method of electrolytically removing material from at least two electrically connected surfaces and electrically conductive and electrolytically erodable workpieces, including the steps of advancing an electrically conductive electrode toward but out of contact with each workpiece surface to be eroded thereby to form a narrow interspace therebetween, pumping an electrolyte through the interspaces defined by the electrodes and the workpiece, the electrodes being substantially inert and chemically insoluble in the electrolyte, passing an alternating electric current between the two electrodes and through the workpiece, whereby material is removed from the two workpiece surfaces, the improvement comprising the additional steps of sensing the voltage drop across each interspace and automatically adding direct current bias to the alternating current under control of the means sensing the voltage drops so that the rate of electrolytic erosion is higher from the workpiece surface which is subjected to the lower voltage drop.

4. The method claimed in claim 3 wherein the electrolyte which is pumped comprises a salt water solution.

References Cited

UNITED STATES PATENTS

| | | | |
|---|---|---|---|
| 2,905,605 | 9/1959 | Keeleric et al. | 204—143 |
| 3,275,538 | 9/1966 | Haupt et al. | 204—143 |
| 3,338,807 | 8/1967 | Clifford | 204—224 |

ROBERT K. MIHALEK, Primary Examiner

U.S. Cl. X.R.

204—224, 225, 228, 268

Dedication 3,466,235.—*Lynn A. Williams*, Winnetka, Ill. ELECTROCHEMICALLY MACHINING A WORKPIECE BETWEEN ADVANCING ELECTRODES HAVING JUXTAPOSED WORKING FACES USING ALTERNATING CURRENT. Patent dated Sept. 9, 1969. Dedication filed Dec. 23, 1971, by the assignee, *Anocut Engineering Company*.

Hereby dedicates to the Public the portion of the term of the patent subsequent to Dec. 24, 1971.

[*Official Gazette April 25, 1972.*]